(12) United States Patent
Choquier et al.

(10) Patent No.: US 6,697,805 B1
(45) Date of Patent: Feb. 24, 2004

(54) XML METHODS AND SYSTEMS FOR SYNCHRONIZING MULTIPLE COMPUTING DEVICES

(75) Inventors: Philippe Choquier, Redmond, WA (US); Martin J. Sleeman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/549,813

(22) Filed: Apr. 14, 2000

(51) Int. Cl.[7] ............................................. G06F 17/30
(52) U.S. Cl. ........................................................ 707/10
(58) Field of Search ...................... 707/2, 4, 10, 201; 705/78; 709/248, 212, 220, 232; 713/400

(56) References Cited

U.S. PATENT DOCUMENTS

| | | | | |
|---|---|---|---|---|
| 5,790,677 A | * | 8/1998 | Fox et al. .................... | 705/78 |
| 6,061,741 A | * | 5/2000 | Murphy et al. ............. | 709/248 |
| 6,078,912 A | | 6/2000 | Buerger et al. .............. | 707/1 |
| 6,167,408 A | | 12/2000 | Cannon et al. ............. | 707/203 |
| 6,185,601 B1 | | 2/2001 | Wolff .......................... | 709/203 |
| 6,240,407 B1 | * | 5/2001 | Chang et al. ................ | 707/2 |
| 6,324,544 B1 | * | 11/2001 | Alam et al. ................. | 707/201 |
| 6,330,600 B1 | | 12/2001 | Matchefts et al. .......... | 709/223 |
| 6,334,178 B1 | | 12/2001 | Cannon et al. .............. | 712/28 |
| 6,345,308 B1 | | 2/2002 | Abe ............................ | 709/248 |
| 6,363,377 B1 | * | 3/2002 | Kravets et al. .............. | 707/4 |
| 6,404,445 B1 | | 6/2002 | Galea et al. ................. | 345/853 |
| 6,507,813 B2 | | 1/2003 | Veditz et al. ................ | 704/8 |

* cited by examiner

*Primary Examiner*—Uyen Le
*Assistant Examiner*—Etienne P LeRoux
(74) *Attorney, Agent, or Firm*—Lee & Hayes, PLLC

(57) ABSTRACT

Extensible markup language (XML) methods and systems for synchronizing a configuration of resources across multiple computing devices are described. In the described embodiment, a computer network comprises a master computing device and a plurality of additional computing devices communicatively linked with the master computing device. The master computing device comprises a configuration of resources that are desired to be synchronized across the additional computing devices. The master computing device is configured to develop a XML list that describes aspects of its configuration of resources. Each additional computing device is configured to receive the XML list that is developed by the master computing device and evaluate the XML list to determine whether its particular configuration of resources are synchronized with those of the master computing device. If a particular additional computing device's configuration of resources is not synchronized with those of the master computing device, the additional computing device prepares a second XML list that describes its resource configuration needs and sends the second XML list to the master computing device. The master computing device receives the second XML list, evaluates it, and sends data to the corresponding additional computing device for use in synchronizing its configuration of resources. Each of the additional computing devices can send separate independent XML lists that describe their resource needs and the master computing device is capable of individually responding to each one. In one aspect, the computing devices are computer servers that are configured as Web servers.

40 Claims, 6 Drawing Sheets

XML METHODS AND SYSTEMS FOR SYNCHRONIZING MULTIPLE COMPUTING DEVICES

TECHNICAL FIELD

This invention relates to extensible markup language (XML) based methods and systems for synchronizing multiple computing devices. In particular, the invention relates to XML based methods and systems for synchronizing multiple different web servers.

BACKGROUND

As the popularity of networked systems, e.g. distributed computing systems, continues to grow and find use in contemporary times, there is an ever increasing need to ensure that certain computing devices within such systems are synchronized. By "synchronized" it is meant that the configuration of resources that each computing device uses to perform its job are the same, and that any associated resource settings are standard across all of the computing devices. Specifically, many times, due to scalability issues (i.e. adding additional computing devices to service a larger or growing client base), it becomes desirable to implement a particular functionality across multiple computing devices. In these instances it is highly desirable for each different computing device to operate identically. This is important because it is likely that different clients will be serviced by different computing devices. Accordingly, it is highly desirable for each client to receive the same service and be able to accomplish the same tasks even though they are using different computing devices. In order for the computing devices to operate identically, the pertinent resource configurations should be the same across all of the computing devices. Yet, often times this is not the case. When the configuration of resources is not standardized, inconsistent results can occur.

As a more concrete example, consider the case of a computing device in the form of a server that is programmed to function as a Web server. The World Wide Web or "Web" works on a client/server model in which client software—known as a Web browser—runs on a local computer. The server software runs on a Web server. Client machines effect transactions with Web servers using Hypertext Transfer Protocol (HTTP), which is a known application protocol providing users with access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Internet Explorer) at a client machine involves specification of a link via the URL. In response, the client makes a request to the server identified in the link and receives in return a document formatted according to HTML. The Web server is usually a standalone file server that services various Web document requests. One particular type of Web server is Microsoft's Internet Information Server (IIS).

One of the problems that has arisen, and one which is particularly illustrated in the context of Web servers, is that customers often need to scale Web servers so that its services are widely available and highly reliable. One way of doing this is to incorporate multiple servers into a networked system. Each of the individual servers should operate identically in order for the same services to be rendered regardless of which server is used to the render services. In order for the servers to operate identically, their resource configurations should be the same. If the resource configurations are not the same, then inconsistent results can occur. Computing devices such as Web servers can typically have many different types of resources and settings. As an example, Microsoft's IIS has resources that include, but are not limited to files, metabase entries, registry keys, and cryptographic functions. Current solutions are inadequate to solve the problems of synchronizing multiple servers. For example, there are solutions that copy files from one server to another, or that replicate a resource setting from one machine to another, but these solutions fall far short synchronizing non-file resources and, in particular, multiple different resources and settings.

Accordingly, this invention arose out of concerns associated with providing systems and methods for synchronizing resource configurations across multiple computing devices.

SUMMARY

Extensible markup language (XML) based methods and systems for synchronizing a configuration of resources across multiple computing devices are described. In the described embodiment, a computer network comprises a master computing device and a plurality of additional computing devices communicatively linked with the master computing device. The master computing device comprises a configuration of resources that are desired to be synchronized across the additional computing devices. The master computing device is configured to develop XML lists that describe aspects of its configuration of resources. Each additional computing device is configured to receive the XML lists that are developed by the master computing device and evaluate the XML lists to determine whether its particular configuration of resources are synchronized with those of the master computing device. If a particular additional computing device's configuration of resources is not synchronized with those of the master computing device, the additional computing device prepares a second set of XML lists that describe its resource configuration needs and sends the second set of XML lists to the master computing device. The master computing device receives the second XML list set, evaluates it, and sends data to the corresponding additional computing device for use in synchronizing its configuration of resources. Each of the additional computing devices can send separate independent XML lists that describe their resource needs and the master computing device is capable of individually responding to each one. In one aspect, the computing devices are computer servers that are configured as Web servers.

One aspect provides a server software architecture that comprises a replication engine to handle XML communication between a master server and a plurality of member servers. At least one driver is provided and is capable of communicating with the replication engine. The driver is associated with a particular resource type (a.k.a. store) that is accessible from the master server. Resources could potentially be stored on a remote location (e.g., a remote file system). In the described embodiment, each resource type of interest has its own separate driver that is programmed to interact with it. Each driver is configured to prepare XML lists that describe characteristics of its associated resource and articulate the XML lists to the replication engine. The replication engine is configured to receive the XML lists from the driver(s) and send the XML lists to one or more of the member servers so that the member servers can use the XML lists to synchronize a resource that corresponds to the resource with which the driver(s) is associated. In the described embodiment, each of the member servers has an architecture that mirrors the architecture of the master server. Accordingly, each member server has a replication engine to handle XML communication with the master server, and a collection of member servers drivers that are individually associated with different resource types that are resident on the member server. Each of the member server drivers is configured to evaluate the resources with which it is associated in response to its replication engine receiving a XML list from the master server's replication engine. The member server driver then determines whether its resources are synchronized with a corresponding resource on the master server. The member server driver is further configured to prepare a XML response to the master server that describes resource needs of the member server in the event that a resource is determined not to be synchronized with the corresponding resource on the master server. The master server receives the XML response with its replication engine and passes the response to the corresponding master server driver that is associated with the resource of interest. The master server driver then prepares a XML reply to the XML response that includes data that can be used by the member server driver to update or synchronize its resource type. The XML reply is sent to the member server and processed by the member server's replication engine. The replication engine passes the XML reply to the appropriate driver so that the driver can synchronize the resource of interest.

Another aspect automatically synchronizes resource configurations across multiple computing devices so that any time a resource configuration is updated or changed on a master computing device, those changes get promulgated to a plurality of member servers. In the described embodiment, promulgation of the resource configuration changes takes place in a list-based manner.

DETAILED DESCRIPTION

Exemplary Computing Device

Figure 1:
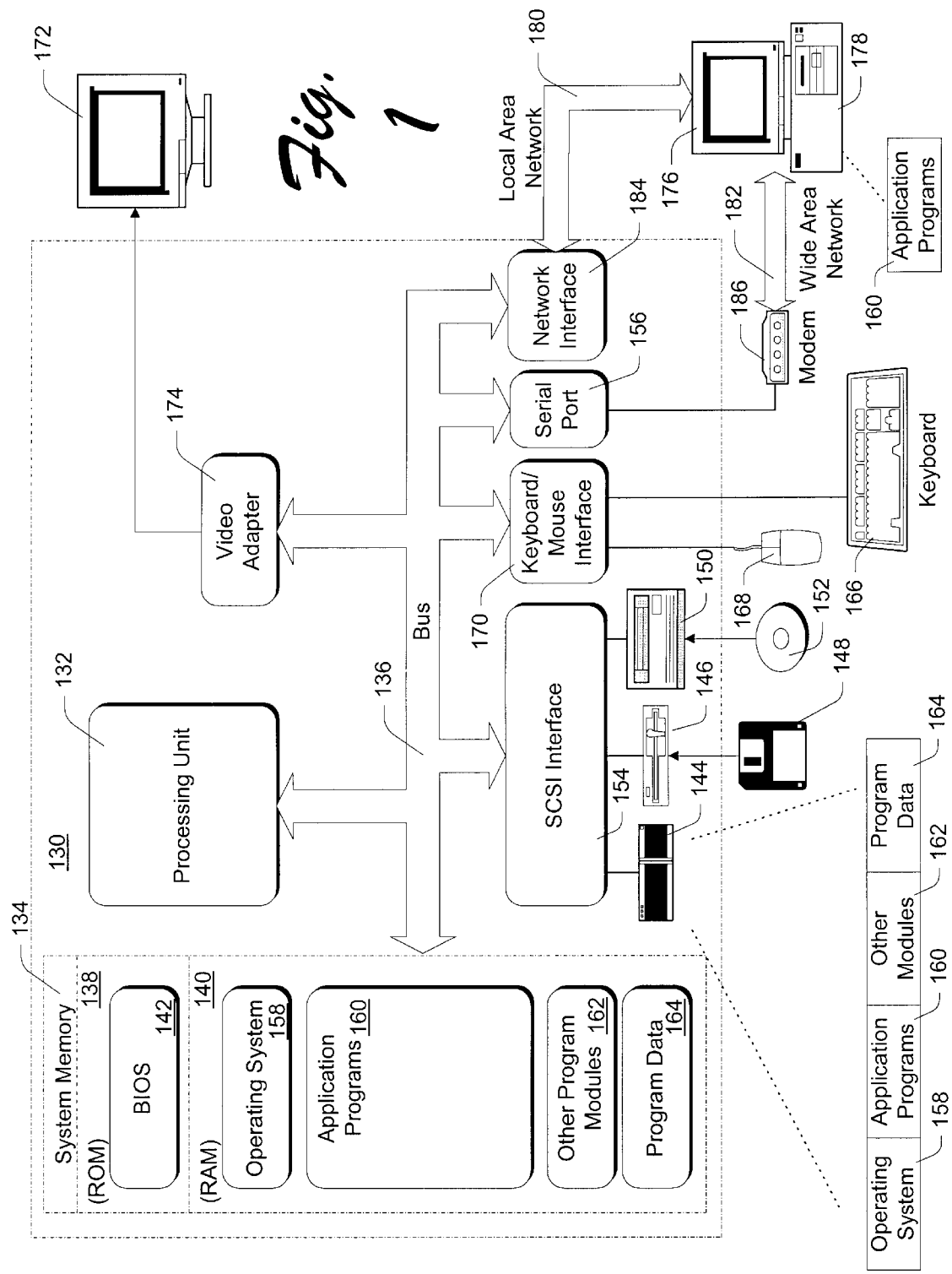
FIG. 1 is a diagram of an exemplary computing device that can be utilized to implement one or more computing devices in accordance with the described embodiment.

Preliminarily, FIG. 1 shows a general example of a computer 130 that can be used in accordance with the described embodiment. Computer 130 can be utilized to implement various computing devices in accordance with the described embodiment.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Overview

The methods and systems described below provide a simple, flexible approach to maintaining a configuration of resources synchronized across multiple computing devices. For purposes of this document, a "configuration of resources" will be understood to include either or both of a collection of resources that a computing device utilizes to implement its functionality, or various resource settings that can be set relative to a resource. Although the described embodiment is described in the context of a computing device that comprises a server and, in particular a web server, it is to be understood that the principles of the described invention should not be so limited. Accordingly, the principles described below are applicable to various other types of computing devices.

For purpose of understanding what constitutes an exemplary "resource", consider Microsoft's Internet Information Server (IIS). There, resources can include, without limitation, files, metabase entries, registry keys, and cryptographic functionality (e.g. certificate stores and the like). A "setting" can constitute any type of setting for a resource. For example, consider that a user creates an application and desires to store the number of threads to use for that application. The "number of threads" can be considered as a "setting" that might typically be stored in the computer's registry (a store).

One advantage of the described embodiment is its ability to promulgate resource configuration changes for any type of resource throughout a system of multiple computing devices. The inventive systems and methods are extensible and provide a degree of flexibility that far exceeds the capabilities of other attempts at synchronization (i.e. merely copying files from one machine to another).

In the described embodiment, two different modes can be utilized to ensure that resources across multiple computing devices remain synchronized. A so-called "full synch" mode can be used to initialize a plurality of different machines to synchronize to a master computing device. This ensures that all of the computing devices in a particular network configuration are standardized. After that an "automatic" mode monitors the master computing device so that any time a change is made to one of its resources, that change is promulgated down through the other computing devices. This, as the name implies, happens automatically without user intervention. In addition, the "full-synch" mode can be utilized to periodically update or "resync" the computing devices so that any resources that have been changed (other than resources on the master computing device) can be placed back into a state which is synchronized with that of the master computing device.

Figure 2:
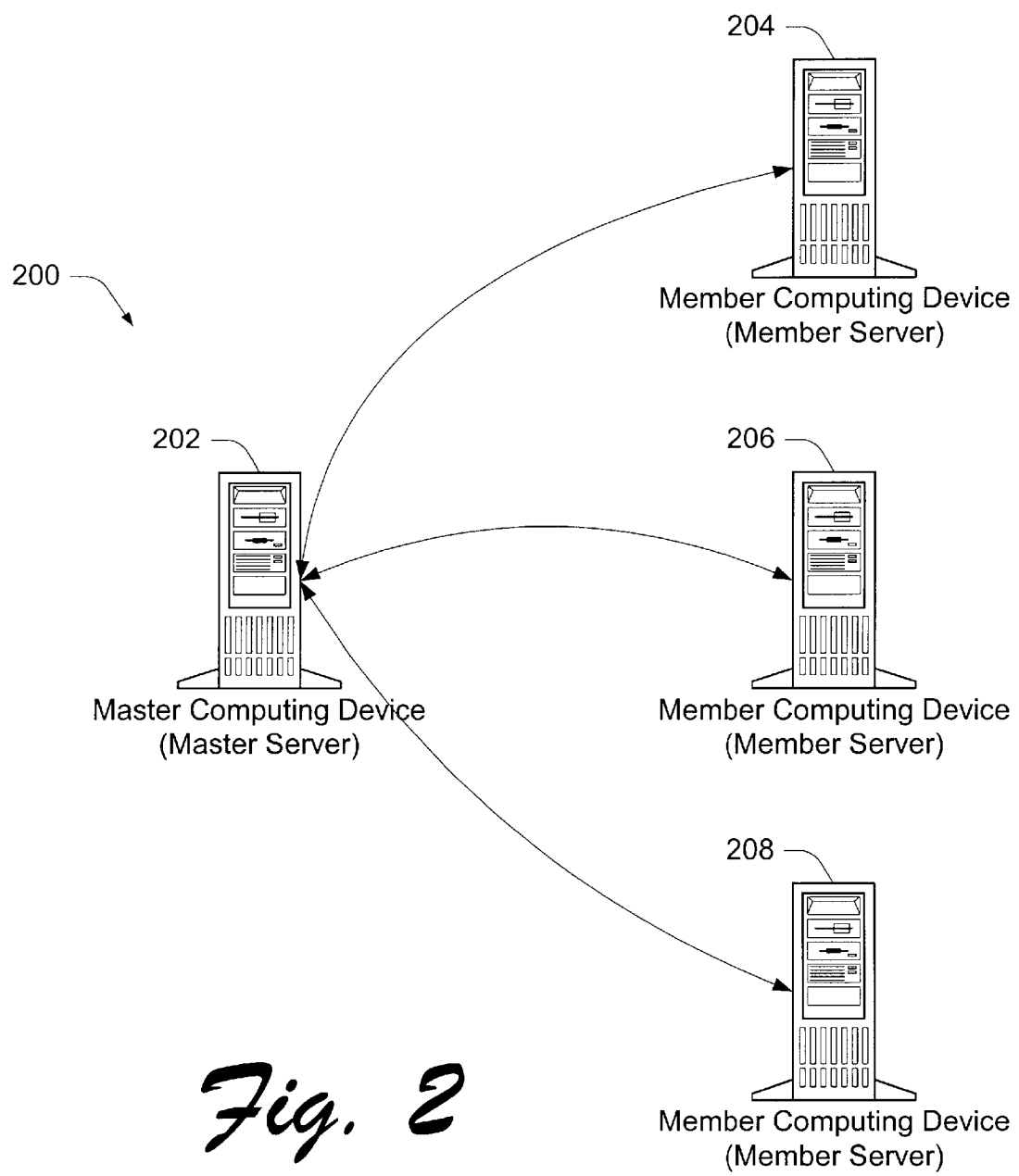
FIG. 2 is a network diagram that illustrates exemplary computing devices in the form of a master server and a plurality of member servers in accordance with the described embodiment.

FIG. 2 shows a computer network 200 which, in accordance with the described embodiment comprises a master computing device 202 and a plurality of additional computing devices 204, 206, 208 communicatively linked with master computing device 202. The master computing device 202 comprises a configuration of resources that are desired to be synchronized across the additional computing devices 204–208. In the "full synch" mode, the master computing device 202 develops lists that describes aspects of its configuration of resources and sends the lists to the additional computing devices 204–208. Each additional computing device 204–208 receives the lists and evaluates the lists to determine whether its particular configuration of resources are synchronized with those of the master computing device. If a particular additional computing device's configuration of resources is not synchronized with those of master computing device 202, the additional computing device prepares a second set of lists that describes its resource configuration needs and sends the second set of lists to master computing device 202. The communication between the master computing device and the additional or member computing devices is indicated by the double-headed arrows in FIG. 2. The master computing device 202 receives the second set of lists, evaluates it, and sends data (e.g. in the form of resources or settings) to the corresponding additional computing device for use in synchronizing its configuration of resources. Each of the additional computing devices 204–208 can send separate independent lists that describe their own particular resource needs and the master computing device 202 is capable of individually responding to each one. In the "automatic" mode, changes in the master computing device's configuration of resources are detected and then data is sent to each of the additional computing devices 204–208 for use in synchronizing its configuration of resources.

One particularly advantageous aspect of the described embodiment is that communication takes place between the master computing device and the additional computing devices through the use of extensible markup language (XML) techniques. Here, XML lists can be sent back and forth between the master computing device and the additional computing devices. The XML lists can either contain embedded update material for use in synchronizing resource configurations, or can reference particular resources that are to be updated using data that is either previously or subsequently sent. It should be appreciated that any format that is capable of describing a hierarchical list of objects would do and that the use of XML represents but one exemplary way of doing so.

One aspect provides a server software architecture that facilitates communication between a master server and additional member servers. In the described embodiment, a replication engine is provided and handles communication between the master server and the member servers. At least one driver is provided and is capable of communicating with the replication engine. The driver is associated with a particular resource type that is accessible from the master server. In the described embodiment, each resource type of interest (there can be many resource types) has its own separate driver that is programmed to interact with it. Each driver is responsible for reading and writing its own content type, as well as other functions. For example, each driver is responsible for preparing a set of lists that describes characteristics of its associated resource and articulating the lists to the replication engine. The replication engine receives the lists from the driver(s) and sends the lists to one or more of the member servers 204–208 so that the member servers can use the lists to synchronize a resource that corresponds to the resource with which the driver(s) is associated.

In the described embodiment, each of the member servers comprises a software architecture that mirrors the software architecture of the master server. Accordingly, each member server has a replication engine to handle communication with the master server, and a collection of member server drivers that are individually associated with different resources that are resident on the member server. Each of the member server drivers evaluates the resource with which it is associated in response to its replication engine receiving a list from the master server's replication engine. The member server driver determines whether its associated resource is synchronized with a corresponding resource on the master server. The member server driver prepares a response to the master server that describes its resource needs in the event that a resource is determined not to be synchronized with the corresponding resource on the master server. In the described embodiment, each member server responds separately, with the separate responses being queued for transmission as one unit for greater efficiency. The master server receives the response with its replication engine and passes the response to the corresponding master server drivers that are associated with the resources of interest. The master server driver prepares a reply to the response that includes data that can be used by the member server driver to update or synchronize its resource. The reply is sent to the member server and processed by the member server's replication engine. The replication engine passes the reply to the appropriate member server driver so that the driver can synchronize the resource of interest.

List-Based Exchange

Figure 3:
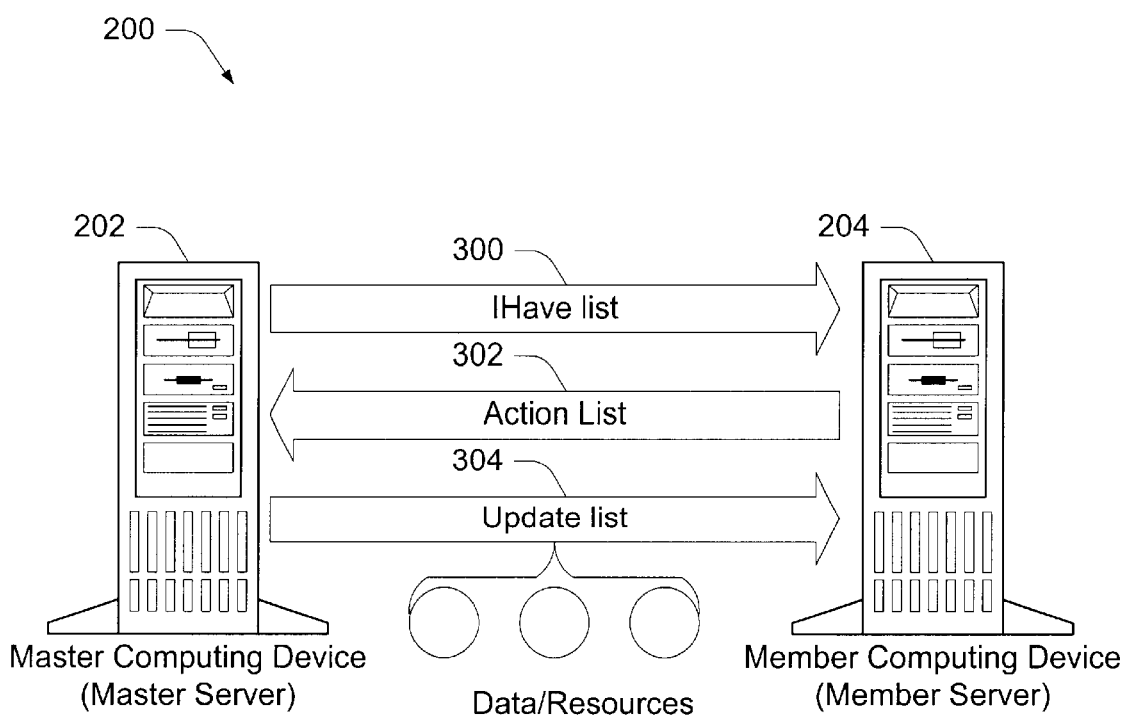
FIG. 3 is a diagram that illustrates an exemplary information exchange between a master computing device and a member computing device in accordance with the described embodiment.

FIG. 3 shows master computing device or master server 202 and member computing device or member server 204, and an exemplary communication exchange between them in more detail. The communication exchange facilitates synchronizing the member servers. In the described embodiment, member server resource configurations are synchronized with resource configurations of the master server through the use of one or more lists that are passed between the servers. Any suitable communication or list can be used in the information exchange between the servers, with an exemplary type of list being discussed below in the section entitled "Extensible Markup Language Lists".

In the illustrated example, master server 202 comprises a configuration of resources that define the content and settings for the master server. Exemplary content and settings were mentioned above. The master server's configuration of resources is desired to be promulgated to other servers, e.g. member server 204, so that the master and member servers can implement a common functionality. In this example, the common functionality that is implemented by the master and member servers is that of a web server. Other functionalities can, of course, be implemented.

The master server 202 is configured to develop a list that describes aspects or characteristics of its configuration of resources. In the illustrated example, an exemplary list 300 is shown as an "IHave" list. This list describes the resources that the master server has-hence the name "IHave". Exemplary aspects or characteristics can include, without limitation, individual signatures that represent one or more of the particular resources. For example, a hash can be made of a particular resource, e.g. a file, and thus constitutes the signature for that resource. Another example of a signature is a date/time stamp. Any type of suitable aspect or characteristic can be used and incorporated in the list that is developed by the master server. In many instances it is desirable to use an aspect or characteristic that represents the resource of interest, yet takes up less room, e.g. in a buffer, than the resource. This enables faster processing than if the entire resource were used. It is possible, in some circumstances, for the aspect or characteristic to comprise the resource itself.

Each of the member servers 204 is communicatively linked with the master server 202 and comprises a configuration of resources that correspond, at least in part, to the configuration of resources of the master server 202. For example, it is possible in some instances for the configuration of resources on one or more of the member servers to have been changed for whatever reason. In this instance, the member server's configuration of resources would not correspond entirely with the master server's configuration of resources. As another example, it is possible for the master server's configuration of resources to have been changed, e.g. adding or deleting a resource. In each of these instances it is highly desirable for the master server's configuration of resources to be promulgated to the member servers so that standardization is preserved.

Each of the member servers 204 is configured to receive the list that is developed by the master server 202 and evaluate the list to determine whether its particular configuration of resources are synchronized with those of the master server. For example, each member server can use the aspects or characteristics that are contained in the list to evaluate their own resources. For example, where the list contains a hash of one or more resources, a member server can make a hash of its corresponding resources using the same hashing algorithm and then simply compare the hashes. Alternately, if a date/time stamp is used, the member server can simply compare the date/time stamps of its associated resources with the date/time stamps contained in the list. If any differences are found during this evaluation, the member server will know that one or more of its resources are not synchronized with the corresponding resource on the master server 202.

In the event that one or more of the member servers 204 determines, through its evaluation of the list provided by the master server 202, that its configuration of resources is not synchronized, the member server is configured to communicate any of its resource needs to the master server 202. In the illustrated example, the member server 204 does so by building a second list 302, referred to in the illustration as an "Action list". The Action list 302 describes the resource or resource configuration needs of the member server. The member server 204 sends the Action list 302 to the master server 202 for evaluation. The Action list 302 requests data in the form of resources or resource settings that will enable the member server to synchronize itself with the configuration of resources of the master server 202. When the master server 202 receives this communication from the member servers, it evaluates the Action list 302 to determine the resource configuration needs of the particular individual member servers. Responsive to its evaluation of the Action list 302, the master server 202 sends the necessary needed data to the member server 204 so it can synchronize its configuration of resources with that of the master server. In the illustrated example, the data that is sent from the master server to the member server can be sent in an Update list 304. The Update list can contain data that describes various resource configuration settings (e.g. the number of threads that a particular application can use) as well as data that represents the resources themselves (e.g. files, certificates and the like). It is also possible for the Update list to merely describe the resources that are going to be sent, with the resources being separately sent in a different communication between the master server 202 and the member server 204 (e.g. large files that might be more economically sent using a different protocol).

In the described embodiment, member servers can be updated in a couple of different ways. In a "full synch" mode, the master server initially sends an IHave list 300 to each of the member servers for the server to do their own evaluation. The member servers evaluate their resource configurations in view of the list and take any measures that are necessary to ensure that they are synchronized with the master server. This process was described immediately above. The full synch mode can advantageously be used to initialize the member servers. Another mode—referred to as an "automatic mode" is used by the master server to automatically update the member servers with resource specific changes. For example, if a particular resource is modified on the master server, data associated only with the changed resource can be sent to the member servers so that they can individually update their corresponding resource.

Extensible Markup Language Lists

As mentioned above, communication between the master server and the member server can take place in any suitable manner. It has been found particularly advantageous, however, to use lists that are defined in terms of extensible markup language (XML). The use of XML greatly facilitates generating, handling, and passing the lists back and forth between the master and member servers.

Extensible Markup Language (XML) is a meta-markup language that provides a format for describing structured data. XML is similar to HTML in that it is a tag-based language. By virtue of its tag-based nature, XML defines a strict tree structure or hierarchy. XML is a derivative of Standard Generalized Markup Language (SGML) that provides a uniform method for describing and exchanging structured data in an open, text-based format. XML utilizes the concepts of elements and namespaces. Compared to HTML, which is a display-oriented markup language, XML is a general purpose language for representing structured data without including information that describes how to format the data for display.

XML "elements" are structural constructs that consist of a start tag, an end or close tag, and the information or content that is contained between the tags. A "start tag" is formatted as "<tagname>" and an "end tag" is formatted as "</tagname>". In an XML document, start and end tags can be nested within other start and end tags. All elements that occur within a particular element must have their start and end tags occur before the end tag of that particular element. This defines a strict tree-like structure. Each element forms a node in this tree, and potentially has "child" or "branch" nodes. The child nodes represent any XML elements that occur between the start and end tags of the "parent" node.

XML accommodates an infinite number of database schemas. Within each schema, a "dictionary" of element names is defined. The dictionary of element names defined by a schema is referred to as a "namespace." Within an XML document, element names are qualified by namespace identifiers. When qualified by a namespace identifier, a tag name appears in the form "[namespace]:[tagname]". This model enables the same element name to appear in multiple schemas, or namespaces, and for instances of these duplicate element names to appear in the same XML document without colliding. Start tags can declare an arbitrary number of "attributes" which declare "property values" associated with the element being declared. Attributes are declared within the start tag using the form "<[tagname][attribute1] [attribute2] . . . [attributeN]>", where an attribute1 through attributeN are declarations of an arbitrary number of tag attributes. Each attribute declaration is of the form "[attributeName]=["attributeValue"]" where each attribute is identified by a unique name followed by an "=" character, followed by the quoted value of the attribute.

Exemplary IHave List

Recall that the IHave list is used by the master server to describe the resources or configuration of resources that each of the member servers should have. The IHave list is built by the master server and then sent to each of the member servers so that they can evaluate their own content and settings. In the described embodiment, the IHave list can include the following selected tags and attributes. It is to be understood that the following table constitutes but one way of implementing the IHave list using XML. Accordingly, other ways of implementing the IHave list either using or not using XML are possible. Optional tags or attributes are enclosed in "[ ]".

| Tag | Attribute | Explanation |
| --- | --- | --- |
| <SCOPE> | RESTYPE [ENUM] | Resource type Either "partial" or "full". This indicates whether the interaction of all items and subnodes is complete. If ENUM is "full", an item or node that is not in this list should be deleted from the member server. If ENUM is "partial" then an item or node that is not in the list is not to be deleted. |
| | ROOT | Defines the absolute root path. |
| | TYPE | Defines the type of list, e.g. IHAVE, ACTION, UPDATE. |
| | [DIFFUSION] | Either "unicast" or "multicast". Indicates how the list is to be dispersed. "Unicast" lists get sent to only one member server while "multicast" lists get sent to many member servers. |
| | [LAST] | Either "0" or "1". Indicates whether this is the last of a list sequence or not. |
| | [ETAGTYPE] | This is utilized to ensure that the content is the same with a high degree of probability. This controls the tradeoff between ETAG computation cost and the probability of generating the same ETAG for different content. Values can include "strong" and "weak" |
| | ITEMSIZE | Total size of all data associated with all items. |
| | ITEMCOUNT | Count of all items. |
| <NODE> | | This tag essentially defines a hierarchy under the root or parent. |
| | SUBPATH | Sub path relative to the father node. |
| | [ENUM] | Either "partial" or "full". If "full", then only data defined by the sub-tree exists, i.e. everything else is to be deleted. |

| Tag | Attribute | Explanation |
|---|---|---|
| <ITEM> | | Defines the granularity of the replication, e.g. a file. |
| | NAME | Name inside the node. |
| | ETAG | Opaque signature of a resource. Can be based on a hash, date/time, etc. |
| | SIZE | Size of all the data associated with this item. |

As an exemplary portion of an IHave list that incorporates the above tags and some or all of the attributes, consider the following:

```
<SCOPE TYPE="IHAVE" LAST="0" RESTYPE="FS"
ROOT="c:\inetpub"
    ETAGTYPE="STRONG" ITEMSIZE="8810" ENUM="FULL"
    ITEMCOUNT="2" DIFFUSION="MULTICAST"
    <NODE SUBPATH="wwwroot" ENUM="FULL">
    <ITEM NAME="default.asp" ETAG="67ED89B"
SIZE="345"></ITEM>
    <ITEM NAME="myimg.jpg" ETAG="5656365"
SIZE="8465"></ITEM>
    <NODE SUBPATH="Images"/>
    <NODE SUBPATH="Apps"/>
    </NODE>
</SCOPE>
<SCOPE TYPE="IHAVE" RESTYPE="FS"
ROOT="c:\inetpub\wwwroot"
    ETAGTYPE="STRONG" ITEMSIZE="4" ITEMCOUNT="1"
    DIFFUSION="MULTICAST"
    <NODE SUBPATH="Images" ENUM="FULL">
    <ITEM NAME="Images.jpg" ETAG="46ED89B" SIZE="4"></ITEM>
    </NODE>
</SCOPE>
```

The exemplary IHave list describes file resources that the master server has in the root "c:\inetpub". Here, the XML list is the last of the XML lists that are being sent. The resource type ("FS") with which the list is associated is a file resource. The RESTYPE is used to identify how and where the list is processed. This will become more apparent below as one exemplary software architecture is described. There are two items (i.e. files) in the subroot "c:\inetpubwwwroot" that are of interest. In addition, there are two subpaths or subdirectories (i.e. Images and Apps). The enumeration for the root "c:\inetpub" is "full" which means that if a particular resource is not described in the IHave list, it is to be deleted from the member server. With respect to the individual file resources, a first of the files is "default.asp" and a second of the files is "myimg.jpg". Each of the files has an associated ETAG which is a signature that represents the file. The signature is compared by the member server to its own corresponding file resource signature to determine whether its file resource is synchronized with the master server resource. The subpath "Images" (represented by the second portion of the XML list) includes one file "Images.jpg" having the indicated ETAG and size.

Exemplary Action List

Once the member server has received the IHave list from the master server and evaluated its resources accordingly, it prepares an Action list that describes its resource needs for the master server. That is, if any of the subject resources are determined to be unsynchronized with the master server's resources, then the member server uses the Action list to articulate its resource needs to the master server. The selected tags and attributes for the Action list are generally the same as the tags and attributes for the IHave list. The Action list does not, however, contain an ETAG attribute. As an exemplary Action list that responds to the IHave list above, consider the following:

```
<SCOPE TYPE="ACTION" LAST="0" RESTYPE="FS"
ROOT="c:\inetpub"
    ITEMSIZE="8810" ENUM="FULL" ITEMCOUNT="2"
    <NODE SUBPATH="wwwroot" ENUM="FULL">
    <ITEM  NAME="default.asp"  SIZE="345"
UPDATETIME=7435:73853"><STREAM/></ITEM>
    </NODE>
</SCOPE>
<SCOPE TYPE="ACTION" RESTYPE="FS"
ROOT="c:\inetpub\wwwroot"
    ITEMSIZE="0" ITEMCOUNT="1">
    <NODE SUBPATH="Images" ENUM="FULL">
    <ITEM NAME="Images2.jpg"><ATTRIBUTES/></ITEM>
    </NODE>
</SCOPE>
```

In the above example, a member server has determined based upon its evaluation of the IHave list that it needs two things to be synchronized. First it needs the file "default.asp", and second it needs the file-system attribute associated with the file "Images2.jpg". The "stream" designation indicates that the member server has requested the actual file itself. Once the member server has built the Action list, it sends the Action list to the master server so that the master server can evaluate the resource needs to the member server and respond to them accordingly.

Exemplary Update List

After the master server receives the Action lists from a member server, it evaluates the member server's resource needs and responds to the member server. In the illustrated example, the master server responds with an Update list. With the Update list, the master server can either embed the needed resource data in the list itself, or simply reference resource data that was or is sent through an alternate means. As an example, consider the exemplary Update list below that responds to the above Action list.

```
<SCOPE TYPE="UPDATE" LAST="0" RESTYPE="FS"
ROOT="c:\inetpub"
    ITEMSIZE="8810" ENUM="FULL" ITEMCOUNT="2"
    <NODE SUBPATH="wwwroot" ENUM="FULL">
    <ITEM  NAME="default.asp"  SIZE="345"
UPDATETIME=7435:73853"><STREAM LINK=
"wwwroot\default.asp"/>
    </ITEM>
    </NODE>
</SCOPE>
<SCOPE TYPE="UPDATE" RESTYPE="FS" ROOT=
"c:\inetpub\wwwroot"
    ITEMSIZE="0" ITEMCOUNT="1">
    <NODE SUBPATH="Images" ENUM="FULL">
    <ITEM
NAME="Images2.jpg"><ATTRIBUTES>6574</ATTRIBUTES>
</ITEM>
    </NODE>
</SCOPE>
```

Here, the Update list responds to the Action list with the requested file "default.asp" and the requested attribute "6574". The requested file has been sent, in this example, through an alternate file transport mode. Only a link to the location where the alternate file transport will put the file content is stored. Thus, in this example, the Update list does not have any of the file data embedded within the XML tags.

The attribute data, however, is embedded directly in the Update list between the "attributes" tags.

At this point in the process, all of the data that the member server needs has been prepared by the master server and sent to the member server. The member server can now take steps to ensure that the data is properly applied for synchronization.

Exemplary Architecture

When addressing the problem of synchronizing resource configurations among multiple different member servers, consideration must be given to the issue of work factorization. That is, how should the work that needs to be done to synchronize the servers actually get done? A balance or tradeoff can be achieved between the need to have resource-specific knowledge and the need to have general knowledge of the system.

Figure 4:
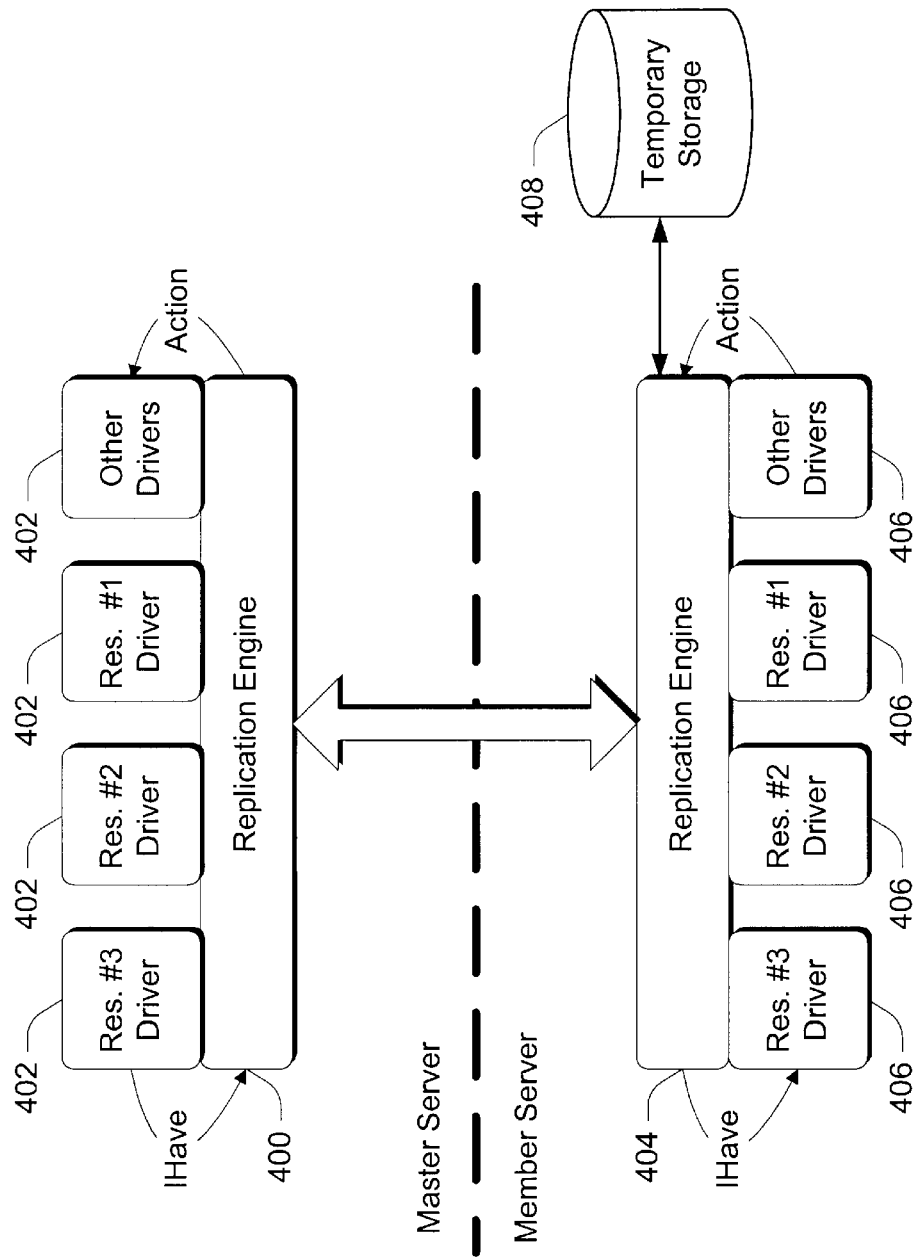
FIG. 4 is a diagram of an exemplary software architecture in accordance with the described embodiment.

FIG. 4 shows but one exemplary software architecture that can achieve the goal of synchronizing multiple member servers. In the illustrated example, the master server comprises a replication engine 400 and one or more master server drivers 402. The replication engine 400 handles communication between the master server and a plurality of member servers. The replication engine 400 is also responsible for coordinating replications among the drivers 402, authentication, error recovery, and transport. Each of the one or more master server drivers 402 is capable of communicating with the replication engine 400. In the illustrated example, each individual driver 402 is associated with a different resource type that is accessible from the master server. The driver is responsible for actually reading and writing its resource type and comparing items within its namespace to determine whether they need to be updated. In addition, each driver is also responsible for informing the replication engine 400 when its corresponding resource has been updated and also in comparing a resource between the master server and a member server. In addition, other driver responsibilities may include such things as encryption, signature generation (and comparison), locking and unlocking the resource, failure (ie problems writing to the store) detection, recovery and reporting, and security.

On the member server side, the software architecture may be essentially a mirror image of the master server architecture. Specifically, the member server comprises a replication engine 404 and one or more member server drivers 406. The collection of member server drivers 406 corresponds to the master server drivers. Accordingly, each member server driver is associated with both (a) a member server resource that corresponds to a particular resource that is resident on the master server, and (b) a master server driver that is associated with that particular resource on the master server. The replication engine 404 handles communication between the member server (i.e. member server drivers 406) and the master server (i.e. replication engine 400).

In the illustrated example, each of the master server drivers 402 is programmed to prepare or generate a list that describes aspects or characteristics of its associated resource type. Specifically, each master server driver 402 can prepare XML lists that are then articulated by the master server driver to the master server's replication engine 400. There are typically multiple lists, one per namespace root per driver, e.g. FS:c:\sub1, FS:c:\sub2, etc. There are typically hundreds of lists for the file system (FS) driver. In the illustrated example, the combination of all these lists constitute the IHave list. The replication engine 400 receives a list from each driver 402, and sends a concatenation of all lists to each of the member servers for use in synchronizing their resources.

Each member server's replication engine 404 receives the IHave lists, parses them, and sends each list to the appropriate driver 406 for processing. There may be more than one IHave list that occurs, but for the sake of simplicity, only one is described. Each of the member server drivers uses the received list to evaluate its resource to determine whether it is synchronized with the corresponding resource on the master server. This can, in some instances, involve comparing the resource signatures with one another to determine whether there are any differences. If the evaluation determines that the resource with which the driver is associated is not synchronized with the corresponding master server resource, then the driver 406 prepares a response (i.e. an Action list) to the master server that describes its resource needs. Each driver's response portion is articulated to the replication engine 404 which formulates a combined response to the master server and then communicates the Action lists to the master server's replication engine. When the master server's replication engine receives the Action lists, it parses them and sends each of the Action list to the corresponding master server driver 402 for evaluation and processing. Each of the drivers 402 is then responsible for supplying the data that is necessary for the member server to synchronize itself. This data is sent by each driver 402 in the form of an XML list to the replication engine 400. This data may only be a link describing a stream that is sent via a particular protocol. The replication engine 400 collects the various XML lists in the form of Update lists that are then sent to the member server's replication engine 404. The replication engine 404 parses the Update lists and sends each list to the appropriate member server driver 406. Each member server driver then commits the updates to a temporary storage 408 until a call is received from the master server informing the member servers to commit the changes.

Exemplary Application Program Interfaces

In the described embodiment, one or more application program interfaces (APIs) are utilized that enable the processing that is described above to take place. An application program interface comprises one or more semantically-related methods that perform particular functions. In the illustrated example, there are three groups of APIs of interest: an engine-to-engine API that enables communication between the replication engines, an engine-to-driver API that enables engine-to-driver communication, and a control API that controls the replication process. The latter API creates replication sessions, stores configurations for the replication processes and essentially controls the replication context.

IReplicationDriver

This interface is found on and implemented by each of the individual resource drivers. Each of the resource drivers is capable of generating IHave lists (master server content description), Action lists (member server requests for content) and Update lists (content updates to be applied on the member servers). This interface includes the following interface methods:

| Method | Description |
| --- | --- |
| DefinePath() | Invoked on the master server. Defines a point in a namespace on which to operate. This method is called to cause the drivers to generate an IHave list, an Action list, or an Update list depending on specified parameters. |

-continued

| Method | Description |
|---|---|
| Process-IHaveList() | Invoked on the member servers. This method enables the drivers to process the IHave list that has been provided by the master server. The drivers return an Action list if necessary. |
| Process-ActionList() | Invoked on the master server. This method enables each driver to ascertain the resource needs of its corresponding member server driver. The driver returns an Update list to the engine after optionally transferring content (e.g. files) to the member server. |
| Process-UpdateList() | Invoked on the member server. Adds update list to current session for commitment at a later time. |
| BeginSession() | Begins a new session. Multiple sessions can exist at a given time. |
| Commit-Session() | Method is called to commit the updates to permanent storage on the member server. |
| ReadyTo-Commit-Session() | A method that is called on the master & member server drivers before calling CommitSession() method on the member servers. Enables the drivers on the member servers to notify the engine of any errors that might prevent full deployment. |
| AbortSession() | Aborts the current session, e.g. releases all queued Update lists. |
| ReadStore-Property() | Reads a store property. |
| WriteStore-Property() | Writes a store property. |

IReplicationEngine

This interface is implemented by each replication engine. This API includes all notifications from drivers to engine and also exposes replication context (e.g. storage location during backup) to the engine. This API is also used for engine-to-engine communication (between the master server and the member servers). This interface includes the following interface methods:

| Method | Description |
|---|---|
| ListNotify() | Callback used by the driver. The driver uses this method to notify the engine with the various type of list that it has developed, e.g. Action lists are presented to ProcessActionList() on the master server; Update lists are presented to each member server using ProcessUpdateList() |
| DefinePath() | Analogous to IReplicationDriver interface. |
| SetServerList() | Sets the server list to use as the target for replication. |
| BeginSession() | Called by the master server engine on the member server engine. Begins a new session. |
| Commit-Session() | Called by the master server engine to the member server engines. Commits the current session and returns only when replicated data has been committed to permanent storage. |
| ReadyTo-Commit-Session() | Forwarded by the master server engine to the member server engines. Calls ReadyToCommitSession() on all drivers on both master and member drivers. This will take place only after ensuring that each driver during the replication session has generated its last Update list. |
| AbortSession() | Forwarded by the master server engine to the member server engines. Aborts the current session. |
| GetReplicationInfo() | Used to retrieve various information, e.g. roots of the backup storage area in a file system, identification of member server's replication engine, identification of replication ID for a particular replication session, etc. |
| TransferList() | Called by the master server engine on the member server engine and by member servers on the master server engine. Requests processing of a replication list (IHave, Action, Update). |

IReplicationControl

This interface manages replication jobs. The interface can be accessed using a command line utility. This utility can take its parameter from either the command line or a file. The interface includes the following methods:

| Method | Description |
|---|---|
| DefineReplication() | This method defines a replication. It can be called to designate automatic updates, to replicate a farm configuration, to include content defined in the system replication definition, to designate a full synch update, to prevent ACLs (Access Control Lists) from being translated, to override replication, and the like. |
| DeleteReplication() | Deletes an existing replication. |
| EditReplication() | Allows any of the parameters that constitute a replication definition to be updated. |
| EnumReplication() | Enumerates all defined replications. |
| GetReplicationInfo() | Retrieves information that has been already defined, e.g. defined in DefineReplication(). |
| CreateReplicationJob() | This method will request an immediate replication by creating a replication job based on a replication definition. |
| AbortReplicationJob() | Aborts an in-progress Replication Job. |
| EnumReplicationJob() | Enumerates replication jobs. |
| GetReplication-JobInfo() | Retrieves replication job information. |
| GetReplication-JobStatus() | Returns the status for a specific replication job. There are two levels that return various degrees of information, e.g. level 1 returns the job state and status; level 2 adds a XML-formatted buffer filled with various information including total count of object to replicate and how many have been replicated thus far, object size, how much of the object has been transferred etc. |
| Backup() | Initiates a full synch to a file path to enable backup. |
| EnumBackup() | Enumerates all backups on a particular computer. |
| GetBackupInfo() | Retrieves backup information. |
| Restore() | Restores a backup on a particular computer. |
| DeleteBackup() | Removes a backup on a particular computer. |
| NotifyStateChange() | This method is called to signal a new member server state change to the master server. |
| AbortAllReplicationJobs() | Called on the master server and aborts all currently running replication sessions, including automatic sessions. |
| WaitForAllReplicationJobsCompletion() | Called on the master server. Returns when all current replication sessions are completed or aborted. |
| StopReplication() | Called on the master server and disables new replication sessions to be scheduled. |
| StartReplication() | Called on the master server to start replication session scheduling and automatic sessions. |
| EnumDriver() | Enumerates all of the drivers on a computer. |
| GetDriverAttr() | Retrieves the value of a named attribute for a specific driver. |
| SetDriverAttr() | Sets the value of a named attribute for a specific driver. |
| GetReplAttr() | Retrieves the value of a named attribute. |
| SetReplAttr() | Sets the value of a named attribute. |

In Operation

In operation, the described embodiment provides a convenient, easy to implement way of maintaining synchronization across multiple computing devices. In the described example, the computing devices constitute web servers although it should be apparent that any suitable computing devices can be synchronized in accordance with the described embodiment. The described embodiments provide a way to synchronize resource types and content across multiple different computing devices.

Figure 5:
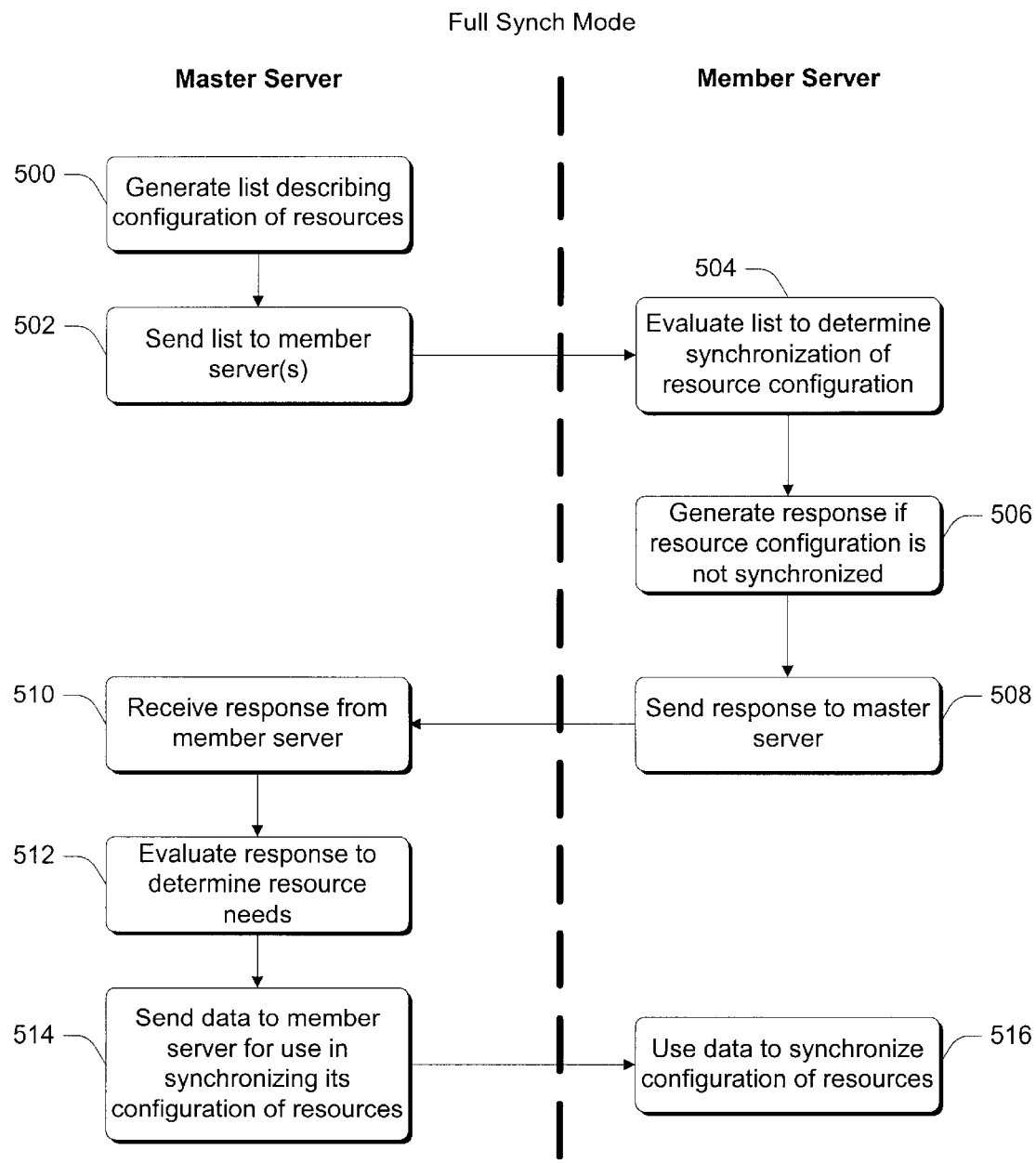
FIG. 5 is a flow diagram that describes steps in a method in accordance with the described embodiment.

FIG. 5 shows a flow diagram that described steps in a method in accordance with the described embodiment. Aspects of the illustrated method are implemented on both the master server side and the member server side. Although the method can be implemented in connection with any suitable hardware, software, firmware or combination thereof, the method can be advantageously implemented in connection with the architecture shown in FIG. 4.

FIG. 5 shows processing that takes place in an exemplary "full synch" mode. Step 500 generates a set of lists that describes a configuration of resources that each of a plurality of computing devices should have in order to be synchronized with one another. In the illustrated example, a master server generates the list through the use of a plurality of resource drivers each of which is associated with a different resource. Each resource driver is responsible for generating their own individual lists that describes their resources and sending the lists to a master replication engine. The replication engine then assimilates all of the lists that are received from the various master server drivers. Step 502 sends the lists (IHave lists) that are prepared by the master server replication engine to each of a number of different member servers. When the member servers receive the lists, each member server evaluates the lists (step 504) to determine whether their resource configuration is synchronized with that of the master server. In the illustrated example, each member server has a software architecture that mirrors the architecture of the master server. Accordingly, the lists are received by the member server's replication engine and individual list are sent to the corresponding member server drivers for evaluation. If, as a result of the evaluation that takes place at the member server, it is determined that one or more resources are not synchronized with a corresponding resource on the master server, step 506 generates a response to the master server. In this example, each member server driver is responsible for their own individual resource evaluation as well as generating a portion of a response that is to be sent to the master server. The member server drivers send their lists to the member server's replication engine which assimilates all of the lists that are generated by the individual drivers. The member server's replication engine then sends the response (Action lists) to the master server (step 508). The master server receives the response from the member server (step 510) and evaluates it (step 512) to determine the resource needs of a particular member server. In the illustrated example, individual master server drivers are handed lists that pertain to the resource with which they are associated. The drivers are then responsible for obtaining the content that is necessary to bring the corresponding member server resource into synchronization with the master server resource. This content or data is then sent to the member server (step 514) for use in synchronizing its associated resource. In the described embodiment, content or data can either be sent separately, e.g. files sent through a file-sending protocol (such as HTTP or FTP ) or the data can be embedded in the lists (Update lists) that are returned to the member server. The member server then receives the content or data that is sent from the master server (step 516) and uses the data to synchronize its configuration of resources.

Figure 6:
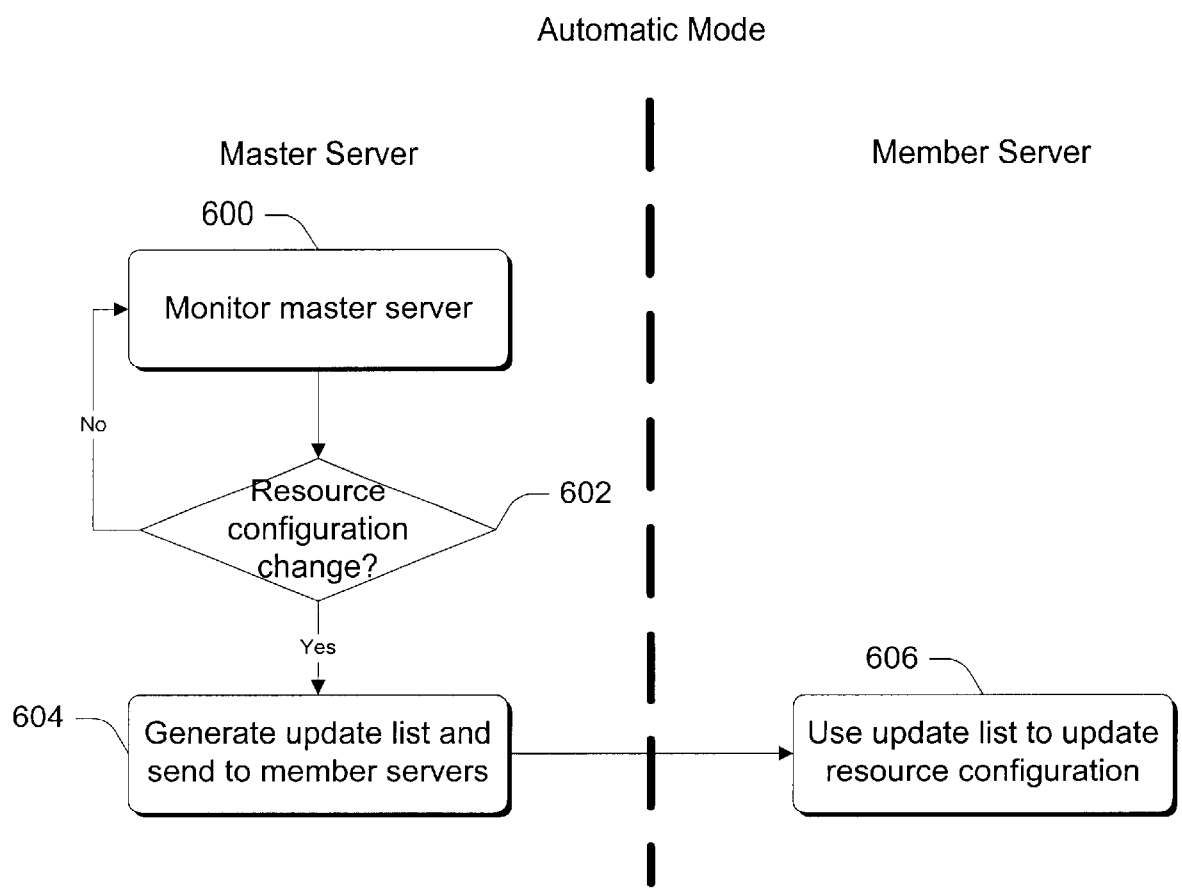
FIG. 6 is a flow diagram that describes steps in a method in accordance with the described embodiment.

FIG. 6 shows steps in a method in accordance with an "automatic mode" in which the master server is monitored for any changes in resources. Step 600 monitors the resources that are resident on the master server. In the illustrated example, each of the master server drivers can be configured to monitor their associated resource. Step 602 determines whether there are any changes to the resource configuration. Here, if one of the drivers detects a change, it can notify the master server's replication engine, which then handles it as for the "full-synch" mode. In this example, each or any of the drivers can generate the Update list. The Update list is received by the member servers and used to update their resource configuration (step 606).

The inventive methods and systems described above provide a simple, flexible approach to maintaining a configuration of resources synchronized across multiple computing devices. The methods and systems are flexible because many different types of resources, e.g. not just simply file resources, can be maintained in a synchronized state at any one time. In the illustrated example, economies are achieved by having each resource on a computing device associated with a different driver that is programmed to maintain its resource. The driver then ensures that its associated resource is synchronized with other resources that are present on other computing devices. Changes to resource configurations are passed ultimately to the associated driver which then ensures that the changes are promulgated to the resource for which the driver is responsible. Advantageously, the inventive methods and systems can be used in the context of web servers, e.g. web server clusters, to ensure that configurations and hence functionalities are standard across multiple different servers.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer-readable medium having an extensible markup language (XML) data structure stored thereon for use in synchronizing a resource configuration across multiple servers, the data structure comprising:

a scope tag indicative of a resource type that is to be synchronized across a plurality of servers;

one or more node tags that are indicative of the locations of one or more corresponding resources of the resource type;

one or more item tags that are individually indicative of individual resources of the resource type, the item tags being configured to contain information describing one or more characteristics of the individual resource; and the data structure being configured to be sent from a master server having a plurality of resources resident thereon to one or more member servers having corresponding resources thereon and used by the member servers to evaluate their own resources and, if necessary, synchronize their own resources with those of the master server.

2. The data structure of claim 1, wherein the scope tag includes an enumeration attribute that indicates whether a particular resource is to be deleted.

3. The data structure of claim 1, wherein the scope tag includes a root attribute that describes a path to a resource of interest.

4. The data structure of claim 1, wherein the scope tag includes a type attribute that is indicative a type of list that the data structure represents.

5. The data structure of claim 1, wherein the scope tag includes an item size attribute that is indicative of the size of particular items that are associated with the data structure.

6. The data structure of claim 1, wherein the scope tag includes an item count attribute that is indicative of the number of items that are associated with the data structure.

7. The data structure of claim 1, wherein the scope tag includes:

an enumeration attribute that indicates whether a particular resource is to be deleted;

a root attribute that describes a path to a resource of interest;

a type attribute that is indicative the type of list that the data structure represents;

an item size attribute that is indicative of the size of particular items that are associated with the data structure; and an item count attribute that is indicative of the number of items that are associated with the data structure.

8. The data structure of claim 1, wherein the one or more node tags can contain a subpath attribute that describes a sub path to an additional node.

9. The data structure of claim 1, wherein the one or more item tags include a name attribute that is indicative of a name of a particular resource.

10. The data structure of claim 1, wherein the one or more item tags include an etag attribute that constitutes a signature for a particular resource.

11. The data structure of claim 1, wherein the one or more item tags include a size attribute that is indicative of the size of the data that is associated with a particular item.

12. A method of synchronizing resources across multiple computing devices comprising:

generating a hierarchical list that describes characteristics of at least one resource that is resident on one computing device, wherein the hierarchical list comprises a tag-based list;

sending the list to one or more other computing devices; and using the list to ensure that at least one resource that is resident on one or more of the other computing devices are synchronized with a corresponding resource that is resident on the one computing device.

13. The method of claim 12, wherein the hierarchical list comprises a tag-based extensible mark-up language (XML) list.

14. The method of claim 12, wherein said list comprises an update list and said using of the list comprises doing so automatically.

15. The method of claim 12, wherein said list describes characteristics of a plurality of resources, and said using comprises:

evaluating one or more resources;

generating an additional hierarchical list if any of the one or more resources are determined to not be synchronized with a corresponding resource on the one computing device; and sending the additional hierarchical list to the one computing device.

16. The method of claim 15, wherein both hierarchical lists comprise tag-based lists.

17. The method of claim 15, wherein both hierarchical lists comprise tag-based extensible mark-up language lists.

18. The method of claim 12, wherein said list describes characteristics of a plurality of resources, and said using comprises:

evaluating one or more resources;

generating an additional hierarchical list if any of the one or more resources are determined to not be synchronized with a corresponding resource on the one computing device, the additional hierarchical list describing the resource needs of one of the other computing devices; and sending the additional hierarchical list to the one computing device; and further comprising:

receiving the additional hierarchical list;

evaluating the additional hierarchical list;

preparing a third hierarchical list that is configured to contain data that can be used by the one other computing device to synchronize one or more of its resources.

19. The method of claim 18, wherein each of the lists has a common schema.

20. The method of claim 18, wherein each of the lists comprises a tag-based list.

21. The method of claim 18, wherein each of the lists comprises a tag-based extensible mark-up language (XML) list.

22. One or more computer-readable media having computer-readable instructions thereon which, when executed by a computer, implement the method of claim 18.

23. One or more computer-readable media having computer-readable instructions thereon which, when executed by a computer, implement the method of claim 12.

24. One or more computer-readable media having computer-readable instructions thereon which, when executed by a computer, implement the following method:

generating a hierarchical list that describes characteristics of at least one resource that is resident on one computing device, the hierarchical list comprising a tag-based, extensible mark-up language list comprising the following tags:

a scope tag indicative of a resource type that is to be synchronized across a plurality of servers;

one or more node tags that are indicative of the locations of one or more corresponding resources of the resource type, wherein the one or more node tags can contain a subpath attribute that describes a sub path to an additional node;

one or more item tags that are individually indicative of individual resources of the resource type, the item tags being configured to contain information describing one or more characteristics of the individual resource; and sending the list to one or more other computing devices; and using the list to ensure that at least one resource that is resident on one or more of the other computing devices are synchronized with a corresponding resource that is resident on the one computing device.

25. The computer-readable media of claim 24, wherein the scope tag includes an enumeration attribute that indicates whether a particular resource is to be deleted.

26. The computer-readable media of claim 24, wherein the scope tag includes a root attribute that describes a path to a resource of interest.

27. The computer-readable media of claim 24, wherein the scope tag includes a type attribute that is indicative a type of list.

28. The computer-readable media of claim 24, wherein the scope tag includes an item size attribute that is indicative of the size of particular items that are associated with the list.

29. The computer-readable media of claim 24, wherein the scope tag includes an item count attribute that is indicative of the number of items that are associated with the list.

30. The computer-readable media of claim 24, wherein the scope tag includes:

an enumeration attribute that indicates whether a particular resource is to be deleted;

a root attribute that describes a path to a resource of interest;

a type attribute that is indicative a type of list;

an item size attribute that is indicative of the size of particular items that are associated with the list; and an item count attribute that is indicative of the number of items that are associated with the list.

31. The computer-readable media of claim 24, wherein the one or more item tags include a name attribute that is indicative of a name of a particular resource.

32. The computer-readable media of claim 24, wherein the one or more item tags include an etag attribute that constitutes a signature for a particular resource.

33. The computer-readable media of claim 24, wherein the one or more item tags include a size attribute that is indicative of the size of the data that is associated with a particular item.

34. A set of application program interfaces embodied on one or more computer-readable media for execution in a computer system for maintaining synchronization between a configuration of resources on a master computing device and a configuration of resources on one or more member computing devices, comprising:
- a first interface method that receives a first extensible markup language (XML) list from the master computing device that describes a configuration of resources that a member computing device should have in order to be synchronized with the master computing device, and which returns a second XML list that describes one or more resources that are needed by the member computing device; and
- a second interface method that receives a third XML list that is configured to contain or reference one or more of the resources that are needed by the member computing device.

35. The set of application program interfaces of claim 34 further comprising a third interface method that enables the configuration of resources that are resident on the member computing unit to be committed on the member computing device.

36. The set of application program interfaces of claim 34 further comprising a third interface method that receives the second XML list and processes it to return the third XML list.

37. An application program interface embodied on one or more computer-readable media for execution in a computer system for maintaining synchronization between a configuration of resources on a master computing device and a configuration of resources on one or more member computing devices, comprising:
- a first interface method that passes a first extensible markup language (XML) list that is associated with a configuration of resources resident on the master computing device;
- a second interface method that passes a second XML list that describes a configuration of resources needed by the member computing device in order to be synchronized with the master computing device; and
- a third interface method that passes a third XML list that is configured to contain or reference one or more of the resources that are needed by the member computing device.

38. The application program interface of claim 37, wherein the XML list comprises a list that describes a configuration of resources that the one or more member computing devices should have in order to be synchronized with the master computing device, the XML list being configured for passing from the master computing device to the one or more member computing devices.

39. The application program interface of claim 37, wherein the XML list comprises a list that describes a configuration of resources that are needed by the one or more member computing devices in order to be synchronized with the master computing device, the XML list being configured for passing from the one or more member computing device to the master computing device.

40. The application program interface of claim 37, wherein the XML list comprises a list that either references or contains one or more resources that the one or more member computing devices need in order to be synchronized with the master computing device, the XML list being configured for passing from the master computing device to the one or more member computing devices.

\* \* \* \* \*